W. DUBILIER.
SELF PROTECTING CONDENSER.
APPLICATION FILED JAN. 16, 1918.

1,350,010. Patented Aug. 17, 1920.

Inventor
William Dubilier
by Cornelius D. Ehret
his Attorney

UNITED STATES PATENT OFFICE.

WILLIAM DUBILIER, OF NEW YORK, N. Y.

SELF-PROTECTING CONDENSER.

1,350,010.  Specification of Letters Patent.  Patented Aug. 17, 1920.

Application filed January 16, 1918. Serial No. 212,096.

*To all whom it may concern:*

Be it known that I, WILLIAM DUBILIER, a citizen of the United States, residing in the city and county of New York, State of New York, have invented a new and useful Self-Protecting Condenser, of which the following is a specification.

My invention relates to condensers utilizable in the electrical arts in various relations and for various purposes, and more particularly as protective devices.

My invention resides in a condenser or electrical protective device of such construction and character that upon subjection to abnormal electrical condition, as for example, when subjected to abnormal electrical voltage or pressure, it protects itself by change in structure in the locality in which the effects of the abnormal electrical condition are produced, the change in structure being such that the condenser or protective device is not destroyed, but continues to be and operate as a condenser or protective device, requiring no repair and obviating necessity for replacement.

In accordance with my invention the condenser structure is such that when the dielectric or insulating material between neighboring condenser plates or armatures is electrically pierced or ruptured, the perforation or aperture produced in the dielectric continues, that is, is not healed or closed, and the material of the adjacent armature or plate of fusible sheet metal is so acted upon by the locally generated heat that it is melted, vaporized or otherwise acted upon, to cause it to recede a considerable distance from the margin of the rupture or aperture in the dielectric material. For this purpose the armature or plate is made suitably thin, and is suitably thin as compared with the thickness of the associated dielectric material which is of mica or other suitable incombustible or non-charring nature.

For an understanding of my invention, reference may be had to the accompanying drawing, in which.

Figure 1:
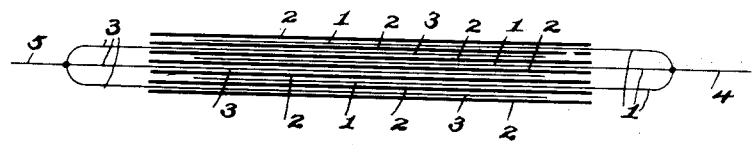
Figure 1 is illustrative of condenser structure, the elements being spaced apart for the sake of clearness.

Referring to Fig. 1, there is therein illustrated one of the well known forms of condenser comprising the opposing armatures or sheets 1 and 3 interleaved with or separated by sheets of dielectric 2, the armatures 1 being connected together and to any suitable terminal, as 4, and the armatures 3 being similarly joined together and to a suitable terminal, as 5.

As well understood in the art, in condensers as actually constructed the armatures and sheets of dielectric material lie close together, and do not stand apart as indicated in Fig. 1.

As one embodiment of my invention, I produce a structure similar to that shown in Fig. 1, in which the sheets 2 of dielectric material are of mica and the armatures or plates 1 and 3 are of metal foil, as tin foil, in close and preferably intimate contact with the mica sheets, such intimacy of contact being procured if desired by insulating binder or adhesive, such as insulating wax or the like, which is used, however, in quantity which is small.

Figure 2:
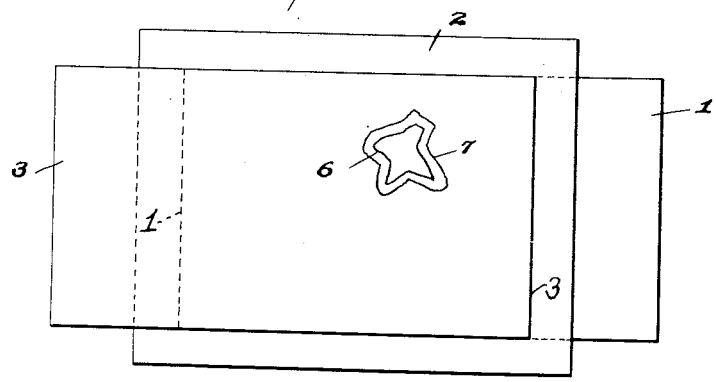
Fig. 2 is a plan view of a sheet of the condenser or protective device dielectric and the neighboring armatures.

For the purposes of my invention, the armatures or plates 1 and 3 are made of tin foil which is very thin as compared with the thickness of the adjacent mica sheets 2. As an example of one embodiment of my invention, the armatures may be of tin foil or other suitable conducting material of preferably not more than one-half mil thickness, and may be approximately one-fourth of a mil thickness, or .00025 inch; and the intervening mica sheets may each be of approximately three mils thickness. With such a construction, if there is impressed upon the terminals 4 and 5 a suitably high difference of electrical potential, an electrical surge or other effect, the dielectric strength in a certain locality of the insulating material of sheets 2 may not be sufficiently great and may break down and be pierced or ruptured by the electric energy, as indicated, for example, in Fig. 2, where there is shown a rupture or aperture 6, of irregular outline, produced by the electric pressure or energy which first produces a small opening through the plate 2, forming a conducting path between the neighboring armatures or plates 1 and 3. The action is accompanied by the liberation of heat which is sufficient to burn or otherwise act upon the material of the insulating sheet 2, with the result that the material of the sheet 2 at the edge of the aperture or rupture is of far lower resistance than the normal resistance of the material of the sheet 2, allowing further passage of electric energy which further enlarges the aperture. The heat accompanying the aforementioned action fuses, vaporizes or otherwise acts upon the relatively thin metal or conducting material of the adjacent armature or plate, the same receding from the margin of the aperture 6 until a condition is reached preventing continued passage of the electric energy by conduction through the sheet 2. The foil 3 in consequence has formed in it the larger aperture 7 of irregular outline roughly corresponding in shape with and more or less parallel to the outline of the aperture 6 in the sheet 2.

Because of the thinness of the foil 3, its very small mass, and its thinness as compared with the thickness of the dielectric sheet 2, the foil or armature 3 simply recedes from the aperture 6, as it increases in size, and there is none of the material of the conducting sheet 3 left at or in the aperture 6 to form a short circuit between the opposing armatures of the condenser, with the result that the condenser has not been rendered inoperative as such, and continues to perform its normal function upon cessation of the abnormal electric pressure.

From the foregoing description it will be seen that the aperture 6 in the dielectric material 2 is not closed, but remains open, the foil having, however, been automatically removed from the area at and around the aperture, and the armature 3 is still effectively insulated by the sheet 2 from its neighboring armature 1.

In accordance with my invention, the perforation or aperture produced in the dielectric material continues and remains as such, and no material is introduced thereinto to heal it or reconstruct the continuity of the insulating sheet; and the material of the adjacent armature or condenser plate is automatically withdrawn or caused to recede from the margin of the aperture to a distance sufficient to interpose between the edge of the aperture in the armature and the neighboring armature on the opposite side of the ruptured dielectric sheet a path whose insulating and dielectric factors are so high as to prevent passage of energy, except by condenser action, between the neighboring armatures under the normal conditions of operation for which the condenser is designed.

It will be understood, therefore, that neither the armature nor the dielectric material is reconstructed or in any wise healed, both remaining deformed and ruptured and left in such state that the structure as a whole continues to function as a condenser or protective device.

To insure that the condenser structure shall be self-protecting as above described, the armature or plate, preferably of readily fusible material, should be thin, and should be relatively much thinner than the associated sheet or plate of dielectric material.

For usual practice, the armature or conducting sheet should not exceed one-sixth of the thickness of the dielectric material, especially when of mica.

It will be understood that while I have herein described my invention in connection with a mica condenser or protective device, that my improvement is not limited to the use of mica, but is applicable to cases employing other material than mica for the dielectric. And it will be further understood that the structure of the condenser or protective device may be anything suitable, and is not limited to the character or structure herein described where the alternate plates of conducting material and dielectric are stacked.

Figure 3:
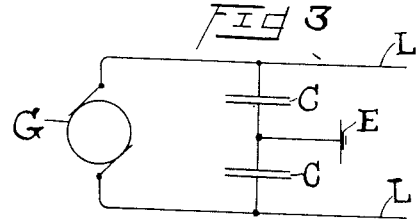
Fig. 3 is a diagram illustrating one of the applications of my invention.

In Fig. 3 is illustrated an arrangement in which a condenser or protective device embodying my invention is employed. G represents a dynamo-electric machine of any suitable type connected to the line conductors L, L. Connected in series with each other between the conductors L, L, preferably at a point as near as possible to the generator G, are the two condensers or protective devices C, C of the character hereinbefore described. From a point between the two condensers a connection is made to earth or ground E.

For example, when the generator G is an alternating current generator delivering current through the conductors L, L to high frequency apparatus, such as commonly used in radio telegraphy, if the high frequency current should surge back to the generator G the latter will become injured, possibly burning out. But a protective device absorbs the high frequency current and conducts it to earth. If the surge should be great enough to break down the protective device, the generator would become short circuited and a large rush of current from the generator would pass through the protective device, causing arcing that would quickly burn away the metal foil and dielectric material, as mica, the foil burning away much more rapidly than the dielectric. As soon as the rush of current from the generator is shut off, which is usually accomplished by the automatic circuit breaker, or automatically in the protective device itself, the circuit through the protective device is again opened, and because of the nature of the protective device hereinbefore described, it continues to function as a condenser or protective device and has not been permanently injured or rendered inoperative.

What I claim is:

1. A self-protecting condenser or protective device comprising foil armatures and intervening non-inflammable dielectric, said armatures being so thin that upon rupture of the dielectric material the material of an armature recedes from the margin of the rupture to a distance preventing conduction between the armatures on opposite sides of said dielectric.

2. A self-protecting condenser or protective device comprising foil armatures and intervening non-inflammable dielectric, said armatures being so thin and relatively much thinner than the dielectric, whereby upon rupture of the dielectric an armature recedes from the margin of the rupture to a distance preventing conduction between the armatures on opposite sides of said dielectric.

3. A self-protecting condenser or protective device comprising foil armatures and intervening non-inflammable dielectric, said armatures being of readily fusible material so thin that upon rupture of the dielectric material an armature recedes from the margin of the rupture to a distance preventing conduction between the armatures on opposite sides of the dielectric.

4. A self-protecting condenser or protective device comprising foil armatures and intervening non-charring dielectric, said armatures constituted of metal and so thin that upon rupture of the dielectric material the metal is fused and recedes from the margin of the rupture to a distance preventing conduction between the armatures on opposite sides of said dielectric.

5. A self-protecting condenser or protective device comprising armatures of tin foil and intervening sheets of mica, said armatures being so thin that upon rupture of the mica the tin foil is fused and recedes from the margin of the rupture to a distance preventing conduction between the armatures on opposite sides of a mica sheet.

6. A self-protecting condenser or protective device comprising armatures and intervening non-inflammable dielectric, said armatures consisting of metal foil less than one mil in thickness, said foil being relatively thin as compared with the dielectric, whereby upon rupture of the dielectric the adjacent armature foil is fused and recedes from the margin of the rupture.

7. A self-protecting condenser or protective device comprising armatures of tin foil and intervening sheets of mica, the tin foil being not greater than one-half mil in thickness and relatively much thinner than the mica, whereby upon rupture of the mica the tin foil is fused and recedes from the margin of the rupture.

8. A self-protecting condenser or protective device comprising foil armatures and intervening non-inflammable dielectric, the ratio of thickness of the dielectric to the thickness of amature being such that upon rupture of the dielectric the adjacent armature recedes from the margin of the rupture to a distance preventing conduction between armatures on opposite sides of the dielectric.

9. A self-protecting condenser or protective device comprising foil armatures and intervening non-inflammable dielectric, the thickness of the armature being less than one-thousandth of an inch and the ratio of thickness of dielectric to thickness of armature being greater than unity.

10. A self-protecting condenser or protective device comprising foil armatures and intervening mica dielectric, the thickness of an armature being not greater than one-half mil, and the thickness of the dielectric not less than six times the thickness of the armature.

11. A self-protecting condenser or protective device comprising foil armatures and intervening mica dielectric, the thickness of the armature being approximately one-quarter of a mil and the thickness of the dielectric not less than about three mils.

12. A self-protecting condenser or protective device comprising tin foil armatures and intervening dielectric of mica, the thickness of an armature being not more than about one-quarter of a mil and the thickness of the mica not less than about three mils.

In testimony whereof I have hereunto affixed my signature this 14 day of January 1918.

WILLIAM DUBILIER.